United States Patent [19]

Lüpertz

[11] 4,350,395
[45] Sep. 21, 1982

[54] PRESSURE CONTROL UNIT

[75] Inventor: Hans-Henning Lüpertz, Darmstadt, Fed. Rep. of Germany

[73] Assignee: ITT Industries, Inc., New York, N.Y.

[21] Appl. No.: 210,181

[22] Filed: Nov. 24, 1980

Related U.S. Application Data

[63] Continuation of Ser. No. 114,798, Jan. 24, 1980, abandoned.

[30] Foreign Application Priority Data

Feb. 26, 1979 [DE] Fed. Rep. of Germany ....... 2907515

[51] Int. Cl.³ .............................................. B60T 11/28
[52] U.S. Cl. .................................... 303/6 C; 188/349
[58] Field of Search ................... 303/6 C, 22 R, 22 A, 303/6 R, 23 R, 23 A; 188/195, 349

[56] References Cited

U.S. PATENT DOCUMENTS 4,101,176  7/1978  Carre et al. ......................... 303/6 C

FOREIGN PATENT DOCUMENTS 2748699  5/1978  Fed. Rep. of Germany ...... 303/6 C
1444397  7/1976  United Kingdom ............. 303/22 R Primary Examiner—Douglas C. Butler
Attorney, Agent, or Firm—John T. O'Halloran; Alfred C. Hill

[57] ABSTRACT

In known brake pressure control units having two pressure control valves arranged in parallel, a tipping lever arrangement is provided for the distribution of the preload force provided by a spring to the control valves which in the event of a failure of one brake circuit will increase the change-over point of the intack brake circuit. This tipping lever arrangement is complicated. Therefore, a brake pressure control unit having two pressure control valves arranged in parallel is disclosed in which the arrangement for the distribution of the preload force comprises a piston tiltable within limits which piston is subjected to the spring force and is directly operatively connected with ends of the two control pistons.

10 Claims, 3 Drawing Figures

PRESSURE CONTROL UNIT

CROSS-REFERENCE TO RELATED APPLICATION

This is a continuation of application Ser. No. 114,798, filed Jan. 24, 1980, now abandoned.

BACKGROUND OF THE INVENTION

This invention relates to a pressure control unit with two pressure control valves arranged in a housing for a vehicle hydraulic brake system. Each pressure control valve is assigned to a separate brake circuit and connected to a pressure generator on the inlet side and to a wheel cylinder on the outlet side. The pressure control valves are arranged essentially in parallel with each other and each includes a control piston subjected to a common control force by the insertion of a means arranged in the housing for the distribution of the force.

German Pat. No. DE-OS 2,748,699 describes a dual pressure regulating valve for a vehicle brake system including a pair of valves each of which includes a housing with an internal bore extending essentially in parallel with the internal bore of the other valve. Each valve includes an inlet port connected to a master brake cylinder or its equivalent, and an outlet port connected to an associated brake actuating member. Each internal bore accommodates a piston which is slidable by pressure against a preload and adapted to close the valve when a pressure which is dependent upon the magnitude of the respective preload is exceeded. Further, both pistons have a common preload generator with a preload distributor distributing the generated preload to the pistons at an essentially constant raio under normal operating conditions. The preload distributor includes a beam which has a piston at each of its ends and between its ends is operatively connected to the common preload generator. The beam is tiltable within limits so that in the event of a failure of part of the brake system an increased portion of the preload of the common preload generator will act on the valve of the common preload generator will act on the valve of the intact brake circuit.

In the known pressure regulating valve, the tipping lever arrangement requires the provision of a guide and a torsion-preventing device in order to maintain the operability of the arrangement. This renders machining and assembly of the pressure control unit more difficult. Another disadvantage is that in the event of failure of one circuit the pressure limitation or pressure reduction will, nevertheless, occur in the intact circuit even if the valve's change-over point is at a higher pressure. In the event of failure of a brake circuit, it is, however, essential to achieve the best possible braking effect with the intake brake circuit. Therefore, any reduction of the braking effect or a limitation of the brake pressure is far from being desirable in that event.

SUMMARY OF THE INVENTION

It is, therefore, an object of the present invention to provide a pressure control unit of the type initially referred to which is of simpler design and easier to assemble.

A feature of the present invention is the provision of a pressure control unit comprising a housing having a longitudinal axis; two pressure control valves disposed in the housing parallel to each other and the axis, each of the two control valves controlling a different brake circuit and being connected to a pressure generator on an inlet side thereof and to a wheel cylinder on an outlet side thereof; and a piston disposed in the housing tiltable within limits and in direct operative relationship with adjacent ends of the two control valves to distribute a common control force to the two control valves.

The advantages of this invention are in particular that the pressure control unit is of very simple design, safe function and allows low-cost manufacture.

In a particularly advantageous improvement of the subject matter of this invention, with the piston in its extreme tilted position, the piston's end close to the control pistons is at its maximum displacement travel which is smaller than the minimum closure travel of the valves. Such an arrangement has the advantage that the valve of the intact brake circuit is maintained open in the event of failure of a brake circuit. This is accomplished in that the whole preload and the skin friction of the piston counteract a displacement of the control piston of the intact brake circuit. As an additional device ensuring the open position of the valve in case of failure of the other brake circuit, it is proposed to provide a stop on which the piston abuts in its tilted position.

The piston suitably has an essentially conical outer surface, with the larger end being conformed to a housing bore, the smaller end being close to the control force, and the piston being tiltable about the axis formed by its largest diameter. It will be particularly advantageous if the piston outer surface is a double cone tapering in opposite directions. This permits displacement of the piston without the risk of jamming.

To reduce the overall length of the pressure control unit of this invention, the piston is advantageously hollow and open on the side close to the helical spring providing the control force, and the helical spring is immersed in the piston. The pressure control unit may be equipped with pressure limiting valves or pressure reducing valves, as required.

BRIEF DESCRIPTION OF THE DRAWING

The above-mentioned and other features and objects of this invention will become more apparent by reference to the following description taken in conjunction with the accompanying drawing, in which.

DESCRIPTION OF THE PREFERRED EMBODIMENTS

Figure 1:
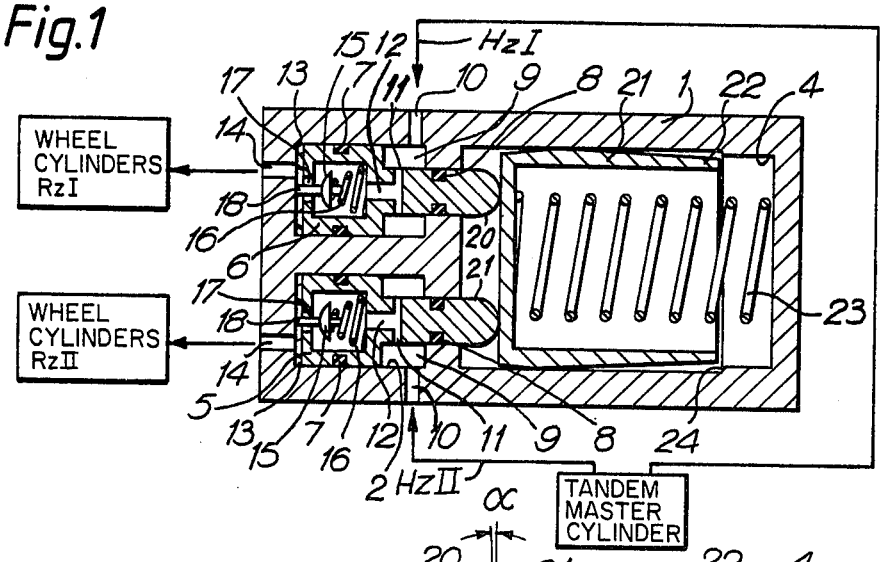
FIG. 1 is a longitudinal cross sectional view through a pressure control unit in accordance with the principles of the present invention with pressure reducing valves.

In FIG. 1, two stepped bores 2 and 3 are arranged in a housing 1 parallel to the longitudinal axis of housing 1 and have their smaller steps opening into a joint third housing bore 4. Bores 2 and 3 accommodate stepped pistons 5 and 6, respectively. The stepped piston arrangements being fully identical, they will be described here only once. Therefore, in the second pressure control valve, like parts have been assigned the same reference numerals as in the first pressure control valve.

Seals 7 and 8 seal stepped piston 6 relative to housing 1. Opening into an inlet chamber 9 which is bounded by an annular surface of stepped piston 6 is a port 10 to which a first brake circuit Hz I of a tandem master cylinder is connected. A radial bore 11 and a coaxial fluid passageway 12 internal of stepped piston 6 connect inlet chamber 9 with an outlet chamber 13. Outlet chamber 13 is bounded by the end surface of the larger step of piston 6 and has a port 14 that is connectible with a wheel cylinder RZ I. Located in fluid passageway 12 is a valve closure member 15 which is urged against a valve seat 17 by a spring 16. Valve closure member 15 includes a tappet 18 extending out of stepped piston 6 and bearing against the front wall of housing 1. Each of the stepped pistons 5 and 6 has at its smaller step an end 19 and 20, respectively, in the form of a spherical segment which extends into bore 4 of housing 1. Bore 4 houses a piston 21 whose outer surface is a cone, with the larger-diameter piston end being close to stepped pistons 5 and 6. The face of the tapered end 22 of piston 21 is open, so that piston 21 is cup-shaped. A helical spring 23 bearing with one end against the housing wall is immersed in cup-shaped piston 21 and acts with its other end on piston 21 against ends 19 and 20 of stepped pistons 5 and 6. As a result of the preload of spring 23, stepped pistons 5 and 6 are maintained in their end positions close to outlet chamber 13 in the inactivated position of the arrangement. A stop 24 is provided in the wall of bore 4.

Figure 2:
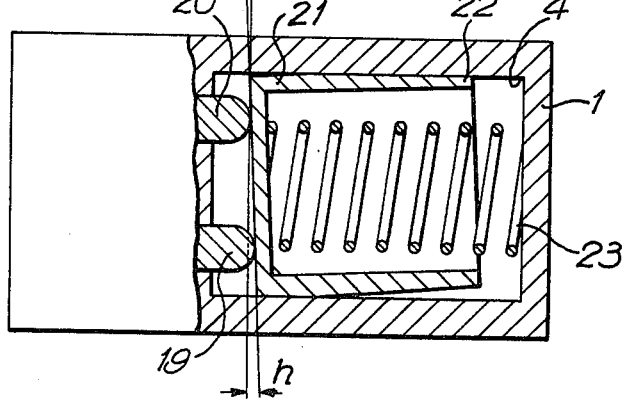
FIG. 2 is a partial longitudinal cross section of the pressure control unit of FIG. 1 when one of the brake circuits has failed.

FIG. 2 shows the pressure control unit of FIG. 1 partially in longitudinal cross section. The reference numerals used are the same as in FIG. 1. In FIG. 2 it is, however, assumed that the first brake circuit Hz I, Rz I has failed. As a result, piston 21 is in a different position.

The mode of operation of the pressure control unit illustrated in FIGS. 1 and 2 is described as follows.

With brake circuits Hz I, Rz I and Hz II, Rz II unpressurized, the arrangement is in the position shown in FIG. 1. Valves 15, 17 are open. When the brake is applied, the pressurized fluid for both brake circuits is allowed to be supplied from port 10 to port 14 unhindered. Caused by the differential of force acting on the stepped pistons, stepped pistons 5 and 6 will move against the preload of spring 23. As soon as stepped pistons 5 and 6 are displaced by the amount of closure travel, valve closure member 15 will become seated on valve seats 17, resulting in closing of fluid passageway 12. The magnitude of pressure at which closing of the valves occurs is determined by the force of helical spring 23. With the pressure continuing to be increased by the master cylinder, there occurs a reduced pressure increase in outlet chambers 13 and, thus, also in wheel cylinders Rz I and Rz II.

For instance, if brake circuit Ha I, Rz I fails, actuation of the brake will cause stepped piston 6 to remain in its end position close to outlet chamber 13, whereas stepped piston 5, as a result of the differential of force acting on it, will be displaced against the preload of helical spring 23. Since in that case the load on piston 21 is no longer balanced, piston 21 will be tilted about the axis formed by the largest diameter of piston 21. The outer surface of tapered end 22 of piston 21 will be urged against the wall of bore 4 on the side of the failed brake circuit. With the angle of inclination $\alpha$ of the piston being at its maximum, the point at which piston 5 is operatively connected to piston 21 will be shifted by amount h which is to be regarded as the maximum displacement travel of the piston in the event of failure of the other brake circuit. Then piston 5 of the intact brake circuit Hz II, Rz II will have acting on it the whole preload of spring 23. Moreover, the skin friction between piston 21 and the wall of bore 4 will counteract a displacement of piston 21 and, thus, of piston 5 in the direction of helical spring 23. If a stop 24 is provided in bore 4, piston 21 in its tilted position will move with the surface of its tapered end 22 into abutment with stop 24, thereby shutting out all possibility of piston 21 being displaced.

Figure 3:
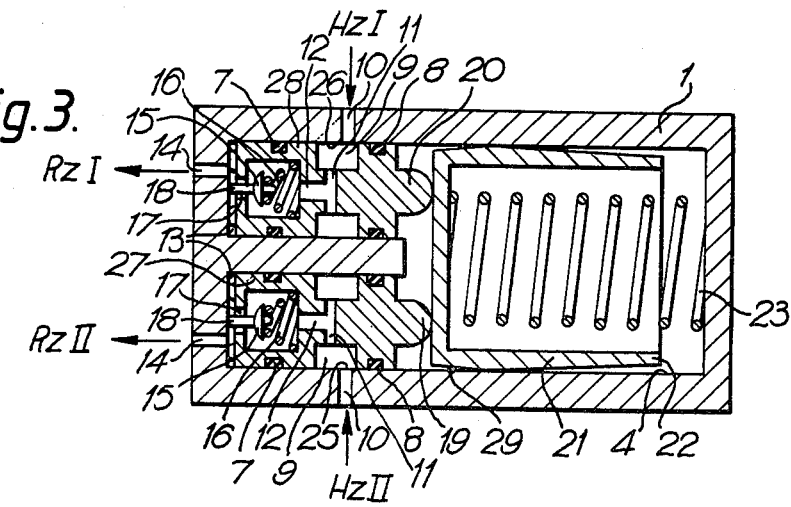
FIG. 3 is a longitudinal cross sectional view of a pressure control valve in accordance with the principles of the present invention with pressure limiting valves.

FIG. 3 shows a pressure control unit which distinguishes from the arrangement hereinabove described merely by the use of pressure limiting valves instead of pressure reducing valves. Therefore, only the differences distinguishing it from the arrangement of FIG. 1 will be dealt with in the following. Like parts have been assigned like reference numerals as in FIG. 1.

The housing 1 accommodates two parallel smooth bores 25 and 26 which open into bore 4. Arranged in bores 25 and 26 are pistons 27 and 28, respectively, of like diameters at seals 7 and 8.

This arrangement results in a different behavior of the pressure control valve when the change-over point is reached. If valve 15, 17 has closed fluid passageway 12 on attainment of the change-over pressure, pistons 27 and 28 will not continue being displaced by a pressure increase at the inlet side, because with the valve closed, the surfaces exposed to the inlet pressure and effective in the opening or closing direction are of equal size.

If a brake circuit fails, the function of the unit illustrated in FIG. 3 is similar to that described with reference to FIGS. 1 and 2.

Moreover, in FIG. 3 piston 21 has a second cone 29 whose tapered end is directed towards control pistons 27 and 28. The arrangement of the second cone prevents piston 21 being jammed when it is shifted back by the preload of spring 23. This second cone arrangement is not to be regarded as being restricted to the embodiment of FIG. 3, but is equally suitable for use in the arrangement of FIG. 1.

While I have described above the principles of my invention in connection with specific apparatus it is to be clearly understood that this description is made only by way of example and not as a limitation to the scope of my invention as set forth in the objects thereof and in the accompanying claims.

I claim:

1. A pressure control unit comprising:
   a housing having a longitudinal axis;
   two pressure control valves disposed in said housing parallel to each other and said axis, each of said two control valves controlling a different brake circuit and being connected to a pressure generator on an inlet side thereof and to a wheel cylinder on an outlet side thereof; and
   a hollow cup-shaped piston disposed in said housing coaxial of said axis tiltable within limits about said axis and having the outer surface of its closed end in direct operative relationship with adjacent ends of said two control valves to distribute a common control force to said two control valves;
   said piston having an outer surface which is at least essentially conical having a larger end disposed adjacent said two control valves, coaxial of said axis and conformed to a housing bore and a smaller end close to said control force.

2. A unit according to claim 1, wherein said piston is hollow and open on the end thereof remote from said two control valves; and further including:

a helical spring providing said control force, said helical spring extending into said piston through said open end thereof.

3. A unit according to claim 2, wherein said two pressure control valves are pressure limiting valves.

4. A unit according to claim 2, wherein said two pressure control valves are pressure reducing valves.

5. A unit according to claim 1, wherein said outer surface of said piston has a double cone configuration tapering in opposite directions.

6. A unit according to claim 5, wherein said piston is hollow and open on the end thereof remote from said two control valves; and further including:

a helical spring providing said control force, said helical spring extending into said piston through said open end thereof.

7. A unit according to claim 6, wherein said two pressure control valves are pressure limiting valves.

8. A unit according to claim 6, wherein said two pressure control valves are pressure reducing valves.

9. A unit according to claims 1 or 5, wherein when said piston is in its extreme tilted position the end thereof adjacent said two control valves is at its maximum displacement travel which is smaller than the minimum closure travel of said two control valves.

10. A unit according to claims 1 or 5, further including a stop within said housing against which an end of said piston remote from said two control valves abuts when said piston is in its tilted position.

* * * * *